(12) United States Patent
Sethi et al.

(10) Patent No.: US 11,924,053 B2
(45) Date of Patent: Mar. 5, 2024

(54) INTELLIGENT INFRASTRUCTURE MANAGEMENT IN A CLOUD RADIO ACCESS NETWORK

(71) Applicant: Dell Products L.P., Round Rock, TX (US)

(72) Inventors: Parminder Singh Sethi, Ludhiana (IN); Nithish Kote, Bangalore (IN); Thanuja C, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/838,624

(22) Filed: Jun. 13, 2022

(65) Prior Publication Data

US 2023/0403203 A1   Dec. 14, 2023

(51) Int. Cl.
| | |
|---|---|
| H04L 41/16 | (2022.01) |
| G06N 20/20 | (2019.01) |
| H04L 41/0631 | (2022.01) |
| H04L 41/0654 | (2022.01) |
| H04W 24/02 | (2009.01) |
| H04W 88/08 | (2009.01) |

(52) U.S. Cl.
CPC .............. *H04L 41/16* (2013.01); *G06N 20/20* (2019.01); *H04L 41/0645* (2013.01); *H04L 41/0654* (2013.01); *H04W 24/02* (2013.01); *H04W 88/085* (2013.01)

(58) Field of Classification Search
CPC . H04L 41/16; H04L 41/0645; H04L 41/0654; G06N 20/20; H04W 24/02; H04W 88/085
See application file for complete search history.

(56) References Cited

PUBLICATIONS

Wikipedia, "C-RAN," https://en.wikipedia.org/wiki/C-RAN, May 17, 2022, 4 pages.
Techtarget Network, "Baseboard Management Controller (BMC)" https://www.techtarget.com/searchnetworking/definition/baseboard-management-controller, May 2007, 3 pages.
Dell, Inc. "Dell OpenManage Baseboard Management Controller Utilites," User's Guide, Sep. 2006, 112 pages.
Dell Technologies, "Introducing the Latest Generation of Dell PowerEdge Servers," Portfolio Brochure, Jul. 2021, 9 pages.
Dell EMC, "PowerEdge Solutions Brochure," Jul. 2018, 4 pages.

(Continued)

*Primary Examiner* — Brian Whipple
(74) *Attorney, Agent, or Firm* — Ryan, Mason & Lewis, LLP (57) ABSTRACT

Techniques are disclosed for intelligent infrastructure management in a radio access network. For example, a method obtains, from a plurality of baseband units of a radio access network, a plurality of data sets, wherein respective ones of the plurality of data sets correspond to operational statistics of respective ones of the plurality of baseband units. The method then generates a forecasted data set corresponding to one or more predicted operational statistics of each of the subset of baseband units, wherein the forecasted data set is generated using a first machine learning model. The method analyzes the forecasted data set to predict a future occurrence of a technical issue and to determine at least one corrective action for the predicted future occurrence of the technical issue, wherein the analysis is performed using a second machine learning model. The method then causes initiation of the at least one corrective action.

20 Claims, 9 Drawing Sheets

(56) References Cited

PUBLICATIONS

Dell Technologies, "Dell EMC PowerEdge Servers for Data Analytics," Solution Brief, May 2021, 2 pages.
Dell Technologies, "PowerEdge R640," Spec Sheet, May 2022, 2 pages.

INTELLIGENT INFRASTRUCTURE MANAGEMENT IN A CLOUD RADIO ACCESS NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to intelligent infrastructure management in a radio access network.

BACKGROUND

In a distributed radio access network (RAN) architecture, each base station or telecommunication (telecom) station of the RAN comprises infrastructure elements including a radio function unit, also known as a remote radio head (RRH), and a digital function unit, also known as a baseband unit (BBU), which is separated from and coupled to the RRH by a high-bandwidth optical fiber link, also known as a fronthaul link. In one particular form of a distributed RAN referred to as a centralized or cloud RAN (C-RAN), the BBUs are deployed in a pool (i.e., functional group) located at a centralized site such as a cloud computing platform or a data center. The BBUs in the pool are typically servers or other computing devices that have relatively high computational and storage capacities, and can be allocated via the high-bandwidth optical fiber link to the RRHs based on current network needs, e.g., user equipment (UE) traffic. In some implementations, the BBUs are interconnected and can communicate amongst themselves.

Further, each BBU is typically set up at a certain geographic radius in a cell in accordance with user population and usage considerations. As processing and throughput statistics from each BBU are accessed periodically by network administrators, deciding to set up a new BBU and/or managing which BBUs are allocated to which RRHs in a geographic area are typically manual tasks performed by one or more network administrators.

SUMMARY

Illustrative embodiments provide techniques for intelligent infrastructure management in a radio access network.

For example, in an illustrative embodiment, a method comprises the following steps performed by a processing platform comprising at least one processor coupled to at least one memory configured to execute program code. The method obtains, from a plurality of baseband units of a radio access network, a plurality of data sets, wherein respective ones of the plurality of data sets correspond to operational statistics of respective ones of the plurality of baseband units. The method then generates, for each of at least a subset of the plurality of baseband units, a forecasted data set corresponding to one or more predicted operational statistics of the baseband unit, wherein the forecasted data set is generated using a first machine learning model. The method analyzes, for each of the at least a subset of the plurality of baseband units, the forecasted data set to predict a future occurrence of a technical issue and to determine at least one corrective action for the predicted future occurrence of the technical issue, wherein the analysis is performed using a second machine learning model. The method then causes initiation of the at least one corrective action.

Advantageously, illustrative embodiments provide an end-to-end analytics engine which uses machine learning models to forecast server performance based on telecom statistics (e.g., throughput, bandwidth, processing speed, etc.) and to find correlations between the telecom statistics so as to take proactive actions to correct any potential performance issues.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as illustratively used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments.

Some cloud infrastructures are within the exclusive control and management of a given enterprise, and therefore are considered "private clouds." On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure.

The term "enterprise" as illustratively used herein is intended to be broadly construed, and may comprise, for example, one or more businesses, one or more corporations, or any other one or more entities, groups, or organizations. An "entity" as illustratively used herein may be a person or system.

Numerous other types of enterprise computing and storage systems are also encompassed by the term "information processing system" as that term is broadly used herein. As illustratively used herein, the terms "client," "customer" or "user" are intended to be broadly construed so as to encompass numerous arrangements of human, hardware, software or firmware entities, as well as combinations of such entities.

Figure 1:
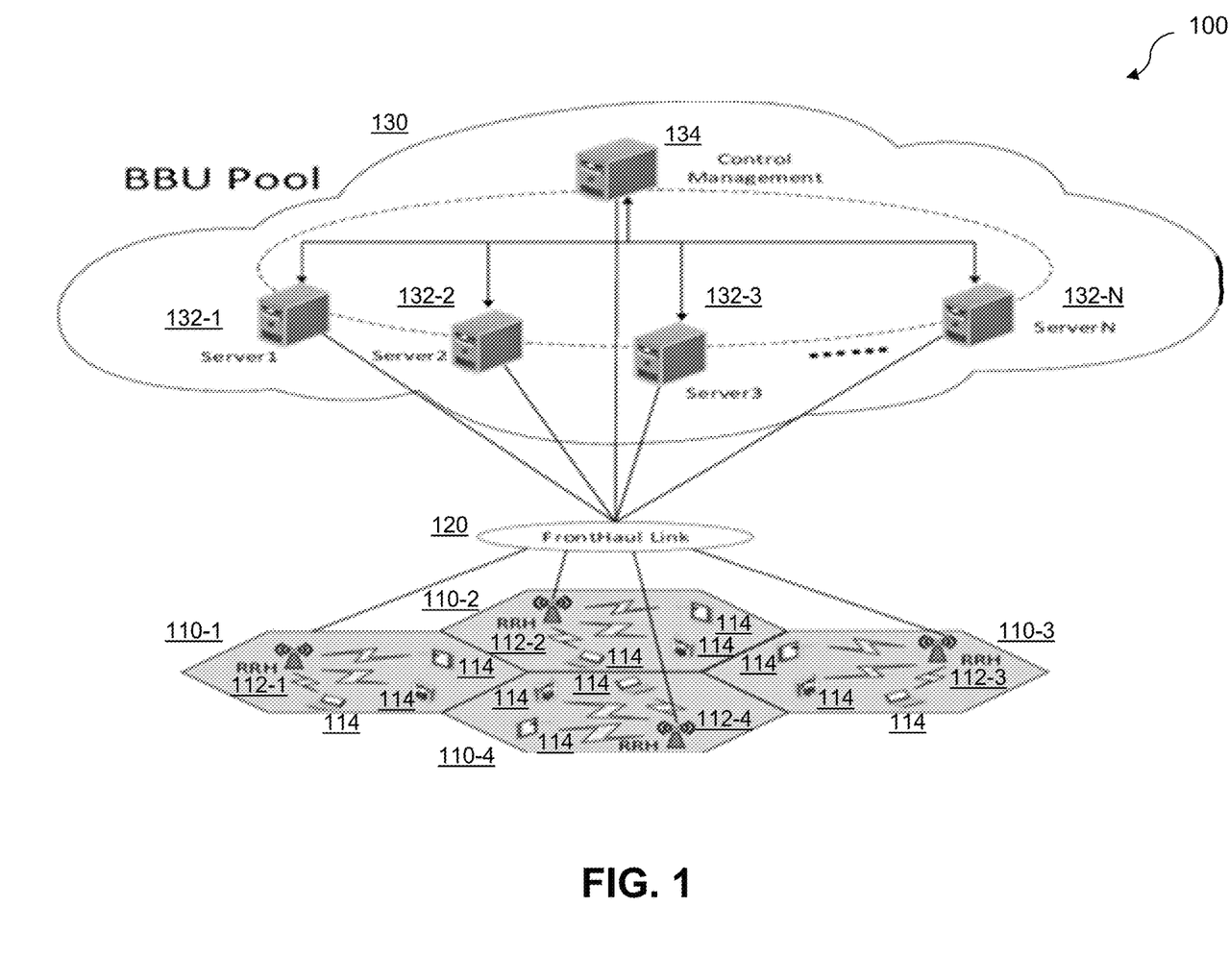
FIG. 1 illustrates an information processing system environment configured with a cloud radio access network according to an illustrative embodiment.

Referring initially to FIG. 1, as depicted, an information processing system environment 100 is configured with a C-RAN architecture according to an illustrative embodiment. It is to be understood that the C-RAN architecture provides the radio access interface for network subscriber devices to access a core telecommunications network such as, by way of example only, a 5GS core network.

More particularly, as shown, a plurality of cells 110-1, 110-2, 110-3, and 110-4 (also collectively referred to herein as cells 110 or individually as cell 110) are respectively configured with a plurality of RRHs 112-1, 112-2, 112-3, and 112-4 (also collectively referred to herein as RRHs 112 or individually as RRH 112). Note that the number of cells 110 and RRHs 112 shown in FIG. 1 are intended as examples, and thus a C-RAN architecture can have any number of cells/RRHs. Each RRH 112 is configured to establish an air interface link with one or more network subscriber devices (e.g., smart phones, laptops, etc.) referred to herein as user equipment (UE) 114. As is known, as a UE 114 physically moves from one cell 110 to another cell 110, it is handed over from the corresponding RRH 112 of the one cell 110 to the other corresponding RRH 112 of the other cell 110 in order to maintain a communication session between UE 114 and the core telecommunications network (not expressly shown). Thus, at any given time, the number of UEs 114 accessing a given RRH 112 can fluctuate.

As further shown in the C-RAN architecture of information processing system environment 100 of FIG. 1, each RRH 112 is coupled via a fronthaul (optical fiber) link 120 to a BBU pool 130 configured with a plurality of BBUs 132-1, 132-2, 132-3, . . . 132-N (also collectively referred to herein as BBUs 132 or individually as BBU 132). For example, BBUs 132 can be in the form of a server or another type of computing device. Each BBU 132 is coupled to each other BBU 132, as well as to a control management server 134 that enables, inter alia, configuration of BBUs 132 and/or set up of a new BBU 132 for operation.

As mentioned for existing approaches, since processing and throughput statistics from each BBU 132 are accessed periodically by the one or more network administrators, deciding to set up a new BBU 132 and/or managing which BBUs 132 are allocated to which RRHs 112 in a geographic area are typically manual tasks performed by one or more network administrators.

Accordingly, it is realized herein that there is currently no methodology to obtain the above-mentioned or other statistics and to use them to solve technical issues such as, but not limited to, addressing inadequate quality of service (QoS) from one or more BBUs 132, and spawning a new BBU 132 to the nearest radius to share the load and handle multiple user requests from UEs 114 accessing the C-RAN architecture. Furthermore, it is realized herein that there is currently no automated intelligence in existing approaches that can analyze the C-RAN infrastructure and generate recommendations for correcting the telecom statistics or usage based on real-time needs for better throughput of BBUs 132 to process multiple requests.

Illustrative embodiments address the above and other technical issues by providing techniques for intelligent infrastructure management in a radio access network. More particularly, intelligent infrastructure management according to one or more illustrative embodiments comprises the deployment and utilization of one or more BBU analyzer engines, as will be further explained below in the context of FIG. 2.

Figure 2:
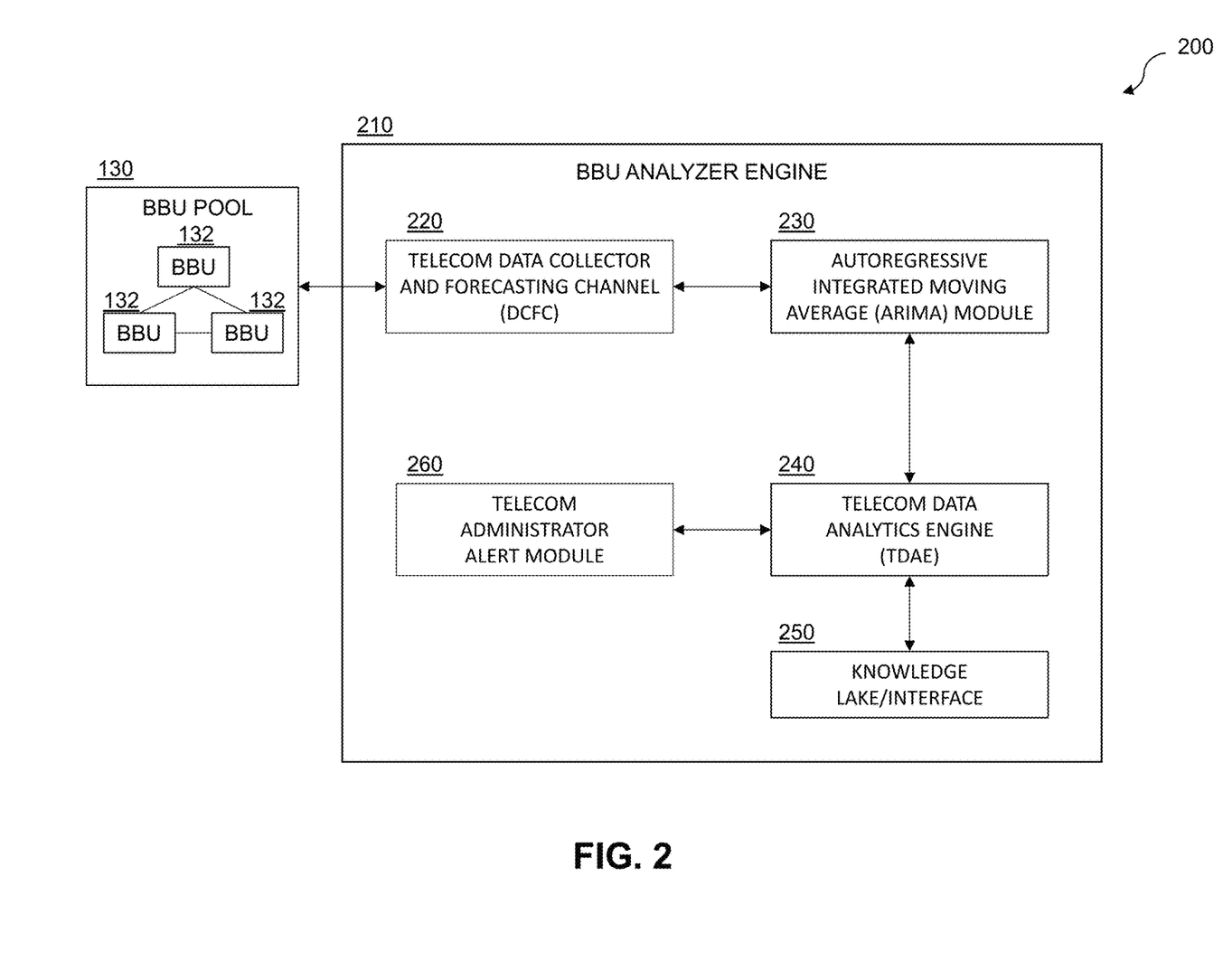
FIG. 2 illustrates a baseband unit analyzer engine according to an illustrative embodiment.

Referring now to FIG. 2, a portion of an information processing system environment 200 comprising a BBU analyzer engine 210 is depicted. As shown, BBU analyzer engine 210 is deployed in conjunction with BBUs 132 of BBU pool 130. In one or more illustrative embodiments, BBU analyzer engine 210 can be implemented in control management server 134. However, in alternative embodiments, BBU analyzer engine 210 can also be deployed in one or more of the servers that comprise BBUs 132. Still further, BBU analyzer engine 210 can be deployed in any computing device operatively coupled to the C-RAN architecture.

As will be further explained in detail herein, BBU analyzer engine 210 is an end-to-end analytics engine that uses one or more artificial intelligence/machine learning (AI/ML) models to forecast server performance (e.g., throughput, bandwidth, processing speed, etc.) on configurable time intervals and to correlate (e.g., find autocorrelations) between the telecom data.

One example of a server that can function as BBU 132 and/or control management server 134 in a C-RAN is a PowerEdge (Dell Technologies of Round Rock, TX) rack server system. PowerEdge comprises a baseboard management controller (BMC, which is typically implemented as part of the server motherboard) that can be adapted to monitor the system for critical events and to send alerts and to log events when certain parameters exceed their preset thresholds. Accordingly, in one or more illustrative embodiments, BBU analyzer engine 210 can be implemented in a BMC of a PowerEdge server. However, it is to be understood that BBU analyzer engine 210 is not limited to any specific server implementation.

As shown in FIG. 2, BBU analyzer engine 210 comprises a telecom data collector and forecasting channel (DCFC) 220, an autoregressive integrated moving average (ARIMA) module 230, a telecom data analytics engine (TDAE) 240, a knowledge lake/interface 250, and a telecom administrator alert module 260, as will be further explained in detail herein.

Figure 3:
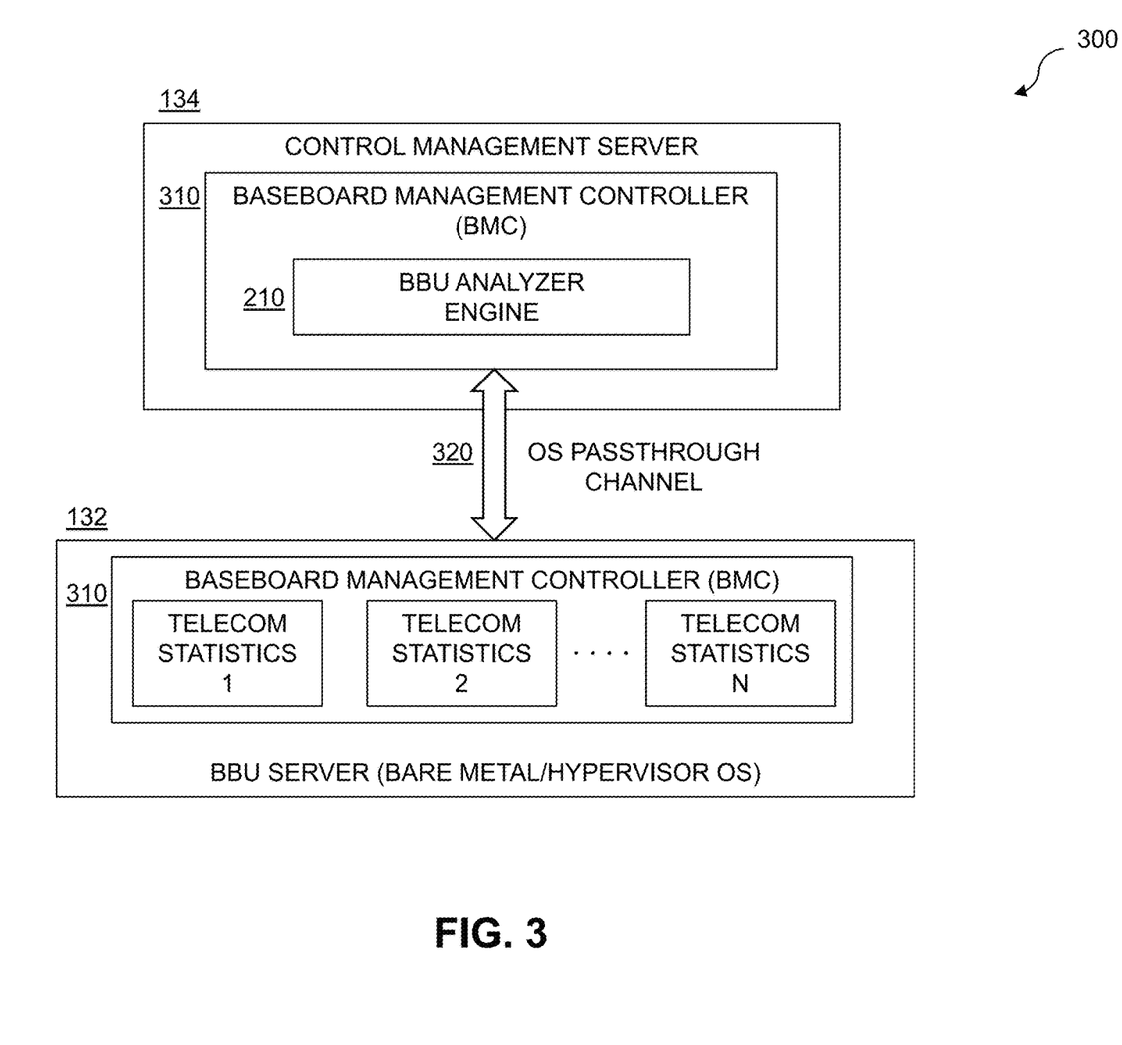
FIG. 3 illustrates collection of telecom data by a baseband unit analyzer engine according to an illustrative embodiment.

As part of BBU analyzer engine 210, DCFC 220 collects telecom data from the user-level/operating system (OS)

level of each BBU 132 via an OS passthrough channel. More particularly, FIG. 3 illustrates a collection operation 300 wherein BBU analyzer engine 210 deployed in a BMC 310 of control management server 134 collects telecom data (telecom statistics 1, telecom statistics 2, . . . , telecom statistics N) maintained locally in a BMC 310 of each BBU 132. The collection of telecom data by BBU analyzer engine 210 is done at a bare metal/hypervisor OS level of BBU 132 via an OS passthrough channel 320 that connects BMC 310 in control management server 134 and BMC 310 in BBU 132.

Telecom data, in one or more illustrative embodiments, is a real-time data set of operational statistics (telecom statistics 1, telecom statistics 2, . . . , telecom statistics N) of the server performance of BBU 132 within BBU pool 130 which includes, but is not limited to, server throughput, bandwidth, BBU radius, number of users (UEs 114), processing speed, etc., and which are present at the user level. The term "real-time" as illustratively used herein is intended to be broadly interpreted as a time instance and/or a time period that is at, or contemporaneous with, online operations performed by the BBU server (e.g., the C-RAN providing radio access to UEs 114 before, during, and after communications sessions with the 5GS core network).

Note that the above-mentioned OS passthrough channel 320 can be implemented using any available channels in servers to communicate, for example, an OS BMC network interface card (NIC), a SupportAssist environment, and an iDRAC Service Module (ISM). However, there are still other channels available in other industry servers as well that can be leveraged, and thus illustrative embodiments are not limited to any specific channel type.

BBU analyzer engine 210 then uses ARIMA module 230, configured with one or more ARIMA time-series artificial intelligence/machine learning (AI/ML) models, to forecast telecom data for a future time period and/or a future time instance. ARIMA module 230 is used to forecast server performance (e.g., throughput, bandwidth, processing speed, etc.) of each BBU 132 by analyzing the telecom data (telecom statistics 1, telecom statistics 2, . . . , telecom statistics N) collected by DCFC 220 from each OS passthrough channel 320 of each BBU 132. The forecasting can also be performed on a subset of BBUs 132 in some embodiments.

Figure 4:
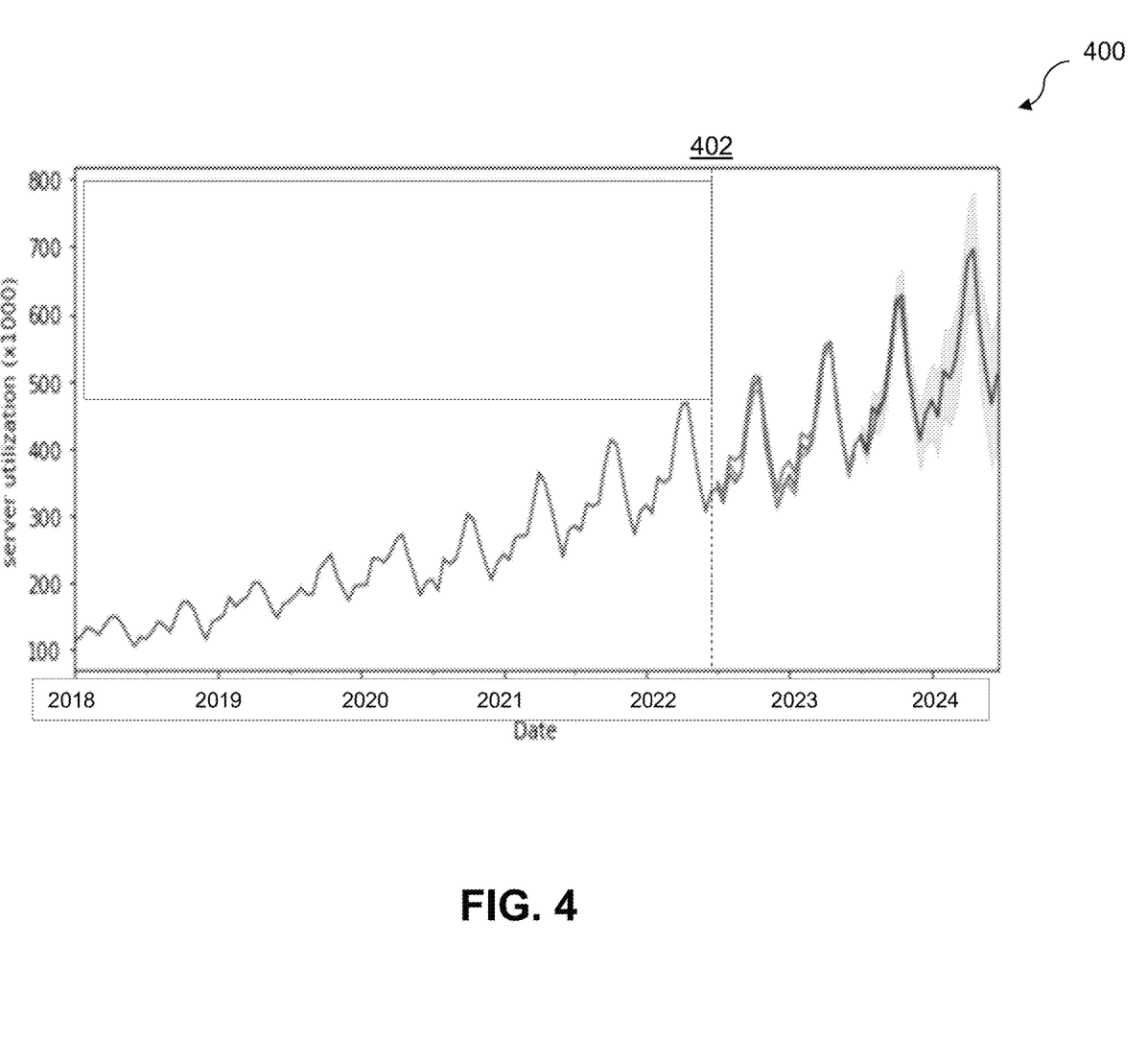
FIG. 4 illustrates a graphical visualization of a server utilization metric monitored and forecasted by a baseband unit analyzer engine according to an illustrative embodiment.
Figure 5:
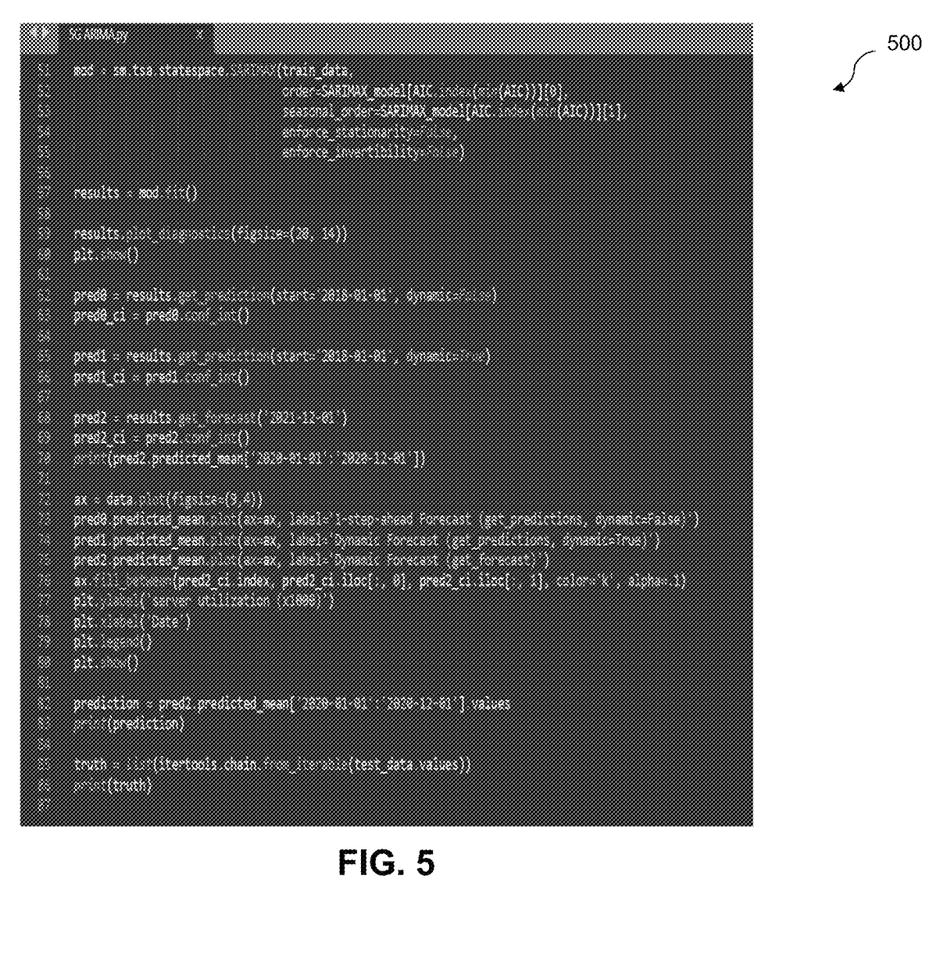
FIG. 5 illustrates program code for forecasting a server utilization metric according to an illustrative embodiment.

DCFC 220 monitors the telecom data (e.g., periodically) to facilitate identifying whether or not there is an issue in the throughput, processing speed, bandwidth, or any other server issues related to the telecom network in the future. As illustrated in graphical visualization 400 of FIG. 4, data collected by DCFC 220 corresponding to a server utilization metric is shown in the plot to the left of line 402 and data forecasted by ARIMA module 230 (based on the data collected by DCFC 220) is shown in the plot to the right of line 402. Note that in illustrative embodiments, different forecasting time horizons can be applied by ARIMA module 230 (e.g., one-step ahead, dynamic, etc.). The forecasted server utilization data over a period indicates whether or not BBU 132 is performing at an expected rate or whether or not the processing speed of BBU 132 will likely be reduced in the future based on the number of user requests. An example of code executable by ARIMA module 230 used to forecast server utilization based on the number of user requests that BBU 132 can process is shown as program code 500 in FIG. 5.

Telecom data analytics engine (TDAE) 240 of BBU analyzer engine 210, configured with one or more AI/ML models, receives as input the forecasted real-time statistics data from ARIMA module 230 and analyzes the forecasted data to determine if there are any technical issues with any BBUs 132 in BBU pool 130. Knowledge lake/interface 250 provides, inter alia, an accessible database of historical technical issues and their historical corrective actions or other outcomes for TDAE 240 to evaluate. Note that the accessible database itself can reside in BBU analyzer engine 210, an interface can be used to access the database remote from BBU analyzer engine 210, or some combination thereof.

Figure 6:
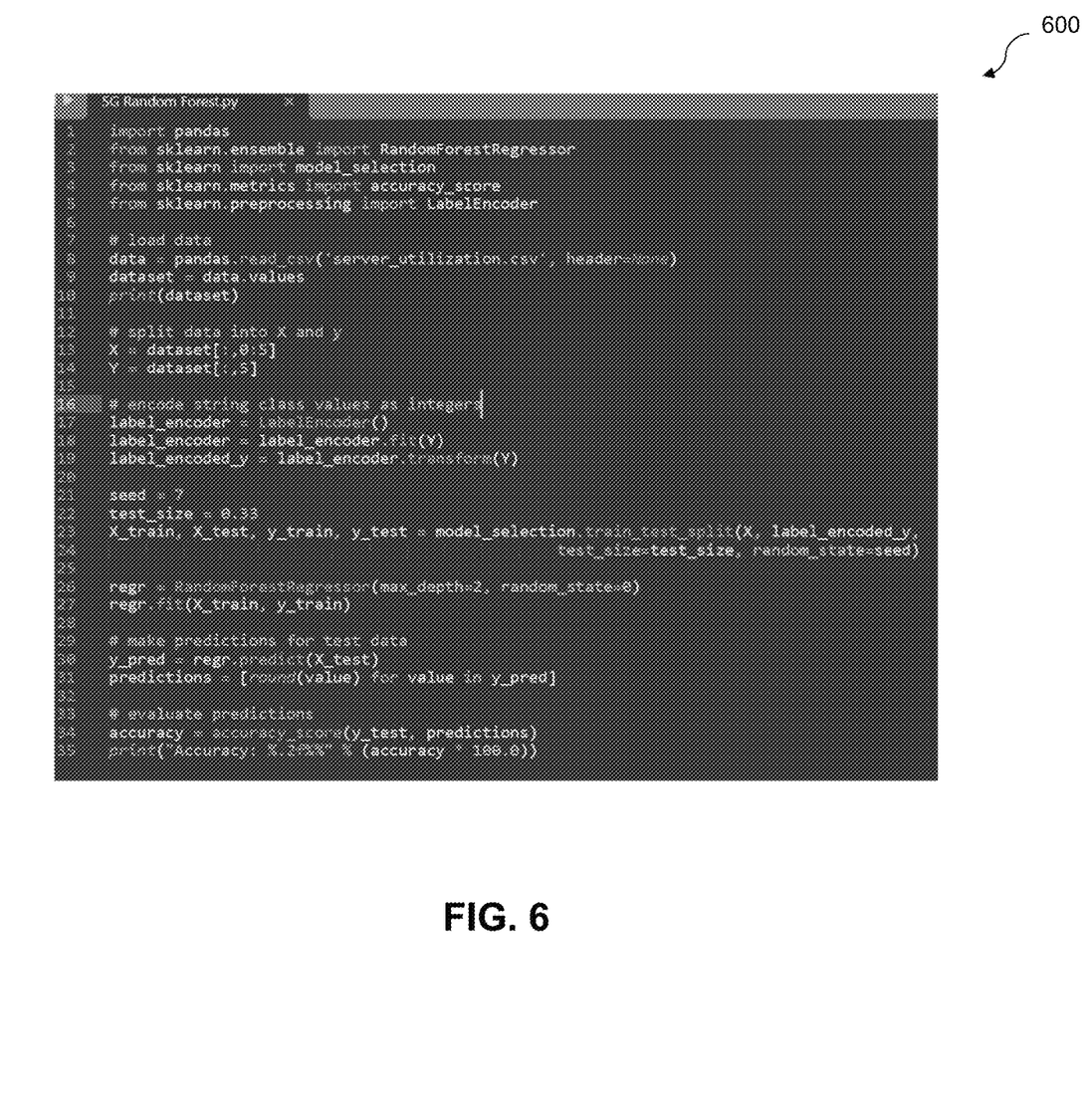
FIG. 6 illustrates program code for analyzing a forecasted server utilization metric according to an illustrative embodiment.

For example, in one or more illustrative embodiments, TDAE 240 employs a random forest ensemble method of machine learning (i.e., one or more AI/ML models) to correlate/compare (analyze) the forecasted statistics, based on the user requests that each BBU 132 can process, across all BBUs 132 in BBU pool 130. From these analytical results of the random forest ensemble method, TDAE 240 is configured to recommend corrective action (e.g., determined with data from knowledge lake/interface 250) such as, but not limited to, initiating spawning of an additional BBU 132 or causing initiation of configuration changes at one or more existing BBUs 132, e.g., such as adding a processing unit to handle incoming requests to retain a normal functioning of the servers forming BBUs 132 in BBU pool 130. An example of code executable by TDAE 240 for analyzing a forecasted server utilization metric to determine corrective actions is illustrated in program code 600 of FIG. 6.

BBU analyzer engine 210 then generates an alert or some other message describing the corrective action via telecom administrator alert module 260. The alert message is provided to a telecom administrator with the necessary corrective action (e.g., troubleshooting step or steps) to be performed and can also comprise comprehensive insight into the root cause of the technical issues and a detailed explanation of how the troubleshooting steps can effectively and efficiently resolve them.

It is to be appreciated that there are several illustrative scenarios for server performance of a BBU 132 to be affected, for example: (i) there is a server hardware issue due to which performance of a given BBU 132 is down; and (ii) there is a sudden increase in the number of users due to which the load on a given BBU 132 has increased and hence the given BBU 132 cannot process and handle the user requests.

Figure 7:
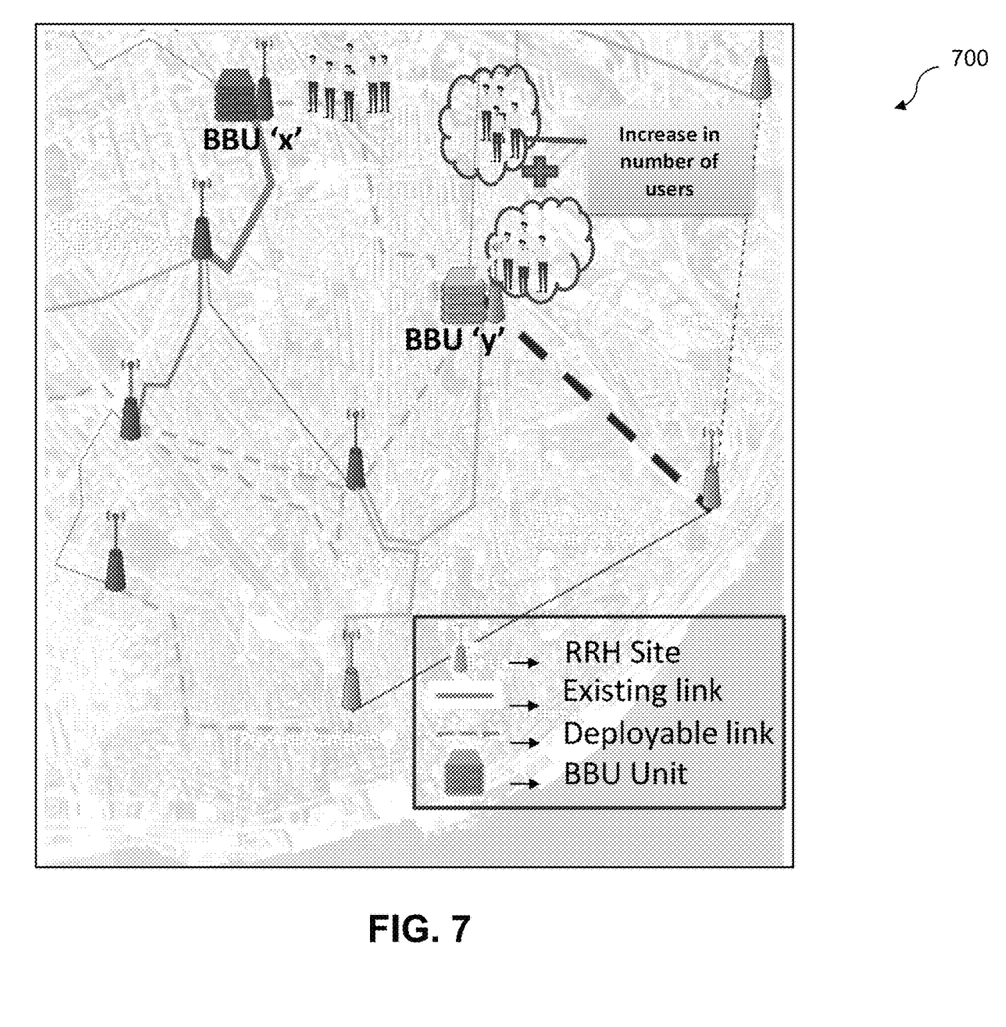
FIG. 7 illustrates a geographical visualization of a correlation operation associated with telecom data analytics of a baseband unit analyzer engine according to an illustrative embodiment.

As explained above, TDAE 240 actively correlates the performance (e.g., throughput, bandwidth, processing speed, etc.) of all the BBU servers connected in the BBU pool and keeps track of the server performance based on the user requests each can process. FIG. 7 shows a geographic visualization 700 of such a correlation operation. For example, as shown, assume BBU 'x' is capable of handling 20,000 requests and that BBU 'y' has a performance degradation and fails to handle incoming user requests due to a sudden increase in the number of users (e.g., UEs 114). TDAE 240 correlates performance and configuration settings of the servers in the BBU pool and identifies and suggests the corrective configuration of BBU 'x' to be performed on BBU 'y' to retain its processing capability and better throughput.

Figure 8:
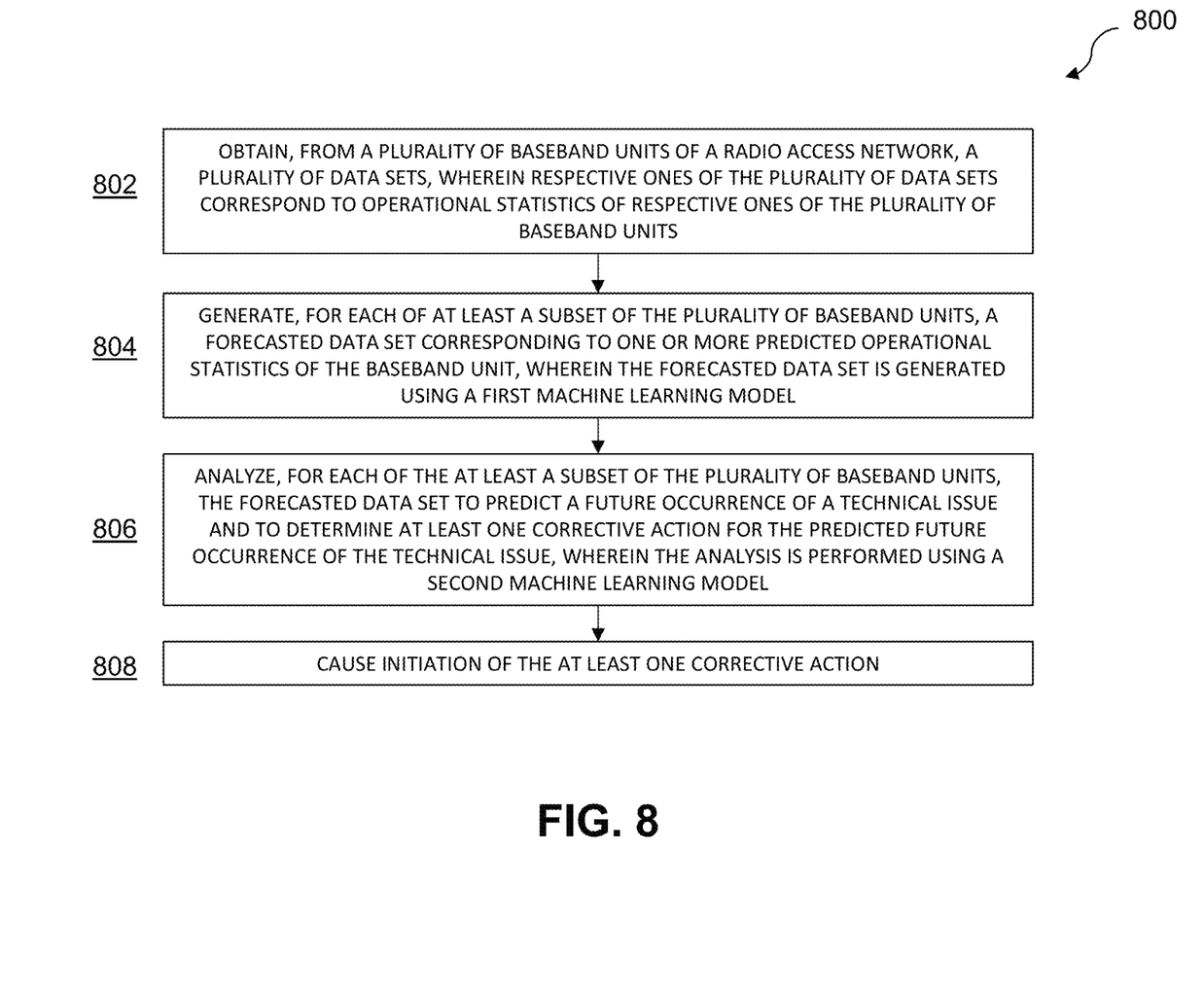
FIG. 8 illustrates a methodology for machine learning-based infrastructure management by a baseband unit analyzer engine according to an illustrative embodiment.

In this scenario, TDAE 240 utilizes data from knowledge lake/interface 250 which stores the historical data of the server performance (e.g., throughput, bandwidth, processing speed, etc.) of the BBU servers present in the BBU pool. To measure the model, the real-time forecasted data obtained from DCFC 220 is divided into training and testing datasets. Training data is used to train the model using the random forest ensemble method with the historical data to suggest corrective actions effectively. However, the testing dataset is used to test the model. In the forecasted real-time data, if there is any irregularity (e.g., not at expected rate) in the BBU performance (e.g., throughput, bandwidth, processing speed, etc.) in the telecom infrastructure, TDAE 240 intelligently decides and suggests the corrective decision, e.g., whether to spawn a BBU or to add another processing unit to the server to handle the incoming user requests. Once TDAE 240 identifies that there is an issue in the BBU server performance, it alerts the telecom administrator with the appropriate action as illustrated in geographic visualization 700 of FIG. 7. FIG. 8 illustrates a methodology 800 for intelligent infrastructure management in a radio access network according to an illustrative embodiment. It is to be understood that methodology 800 can be implemented in BBU analyzer engine 210 of FIG. 2 in one or more illustrative embodiments.

Step 802 obtains, from a plurality of baseband units of a radio access network, a plurality of data sets, wherein respective ones of the plurality of data sets correspond to operational statistics of respective ones of the plurality of baseband units.

Step 804 generates, for each of at least a subset of the plurality of baseband units, a forecasted data set corresponding to one or more predicted operational statistics of the baseband unit, wherein the forecasted data set is generated using a first machine learning model.

Step 806 analyzes, for each of the at least a subset of the plurality of baseband units, the forecasted data set to predict a future occurrence of a technical issue and to determine at least one corrective action for the predicted future occurrence of the technical issue, wherein the analysis is performed using a second machine learning model.

Step 808 causes initiation of the at least one corrective action.

Advantageously, by way of example only, illustrative embodiments collect the telecom-related information in a BMC or the like (e.g., a chassis management controller or CMC) using a passthrough channel which can be leveraged for multiple telecom-related use cases, infrastructure planning, and correcting the telecom network for best throughput and efficiency in a C-RAN. Further, illustrative embodiments provide communication between the BBUs and a control management server in a C-RAN at a BMC level. That is, illustrative embodiments collect the telecom information at the BBU level and derive real-time status of a particular BBU. This information can be used for multiple telecom use cases such as, by way of example, alerting the telecom administrator in the event of a low performing BBU in a C-RAN. Still further, illustrative embodiments comprise real-time telecom statistics streaming and monitoring functionalities and an alerting functionality to dynamically manage the telecom infrastructure in a C-RAN. That is, all the BBU servers which are part of the C-RAN maintain telecom information at the BMC level, and are configured to expose the information concerning BBU performance.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 9:
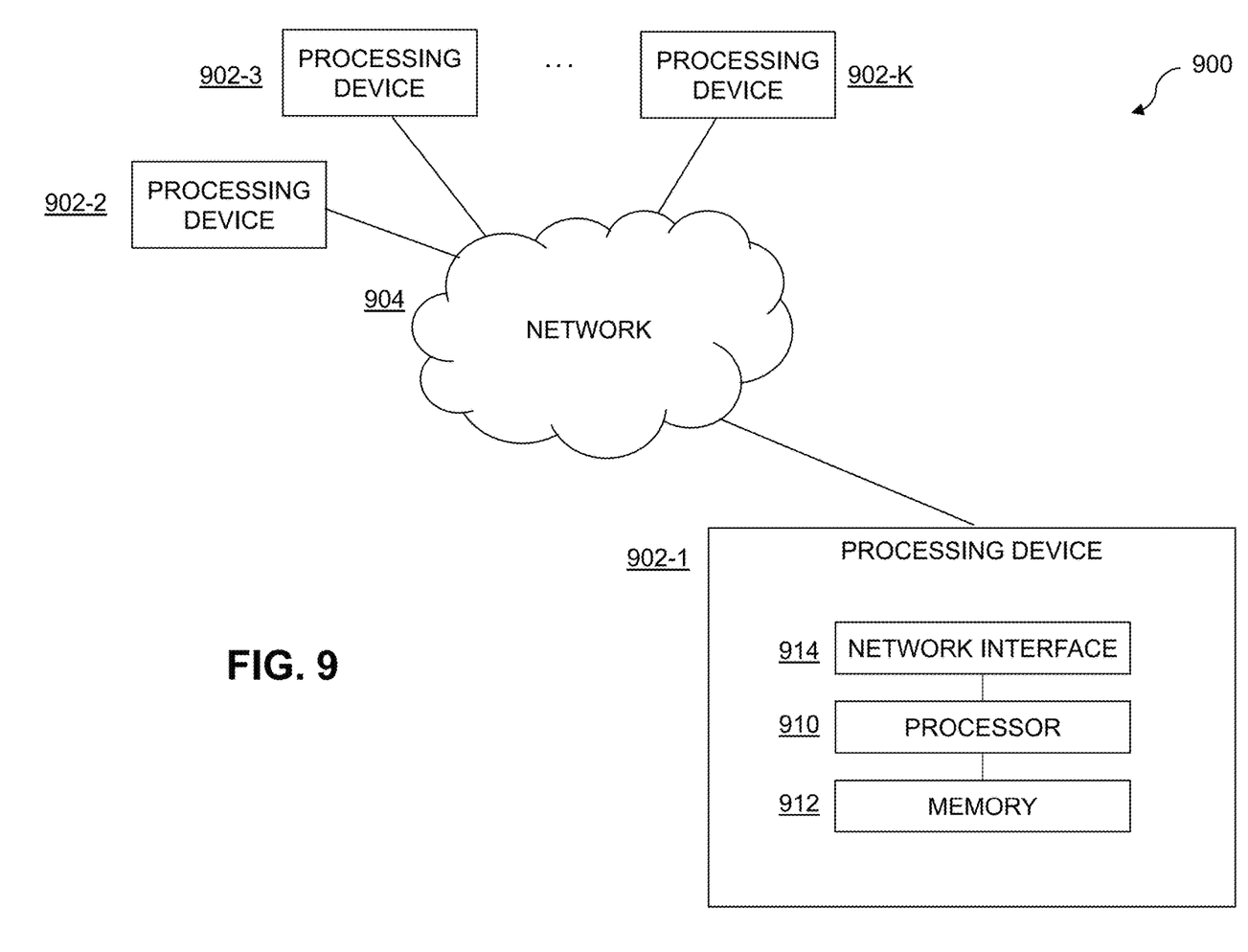
FIG. 9 illustrates an example of a processing platform utilized to implement at least a portion of an information processing system for machine learning-based infrastructure management by a baseband unit analyzer engine according to an illustrative embodiment.

FIG. 9 depicts a processing platform 900 used to implement information processing systems/processes depicted in FIGS. 1 through 8, respectively, according to an illustrative embodiment. More particularly, processing platform 900 is a processing platform on which a computing environment with functionalities described herein can be implemented.

The processing platform 900 in this embodiment comprises a plurality of processing devices, denoted 902-1, 902-2, 902-3, . . . 902-K, which communicate with one another over network(s) 904. It is to be appreciated that the methodologies described herein may be executed in one such processing device 902, or executed in a distributed manner across two or more such processing devices 902. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 902 shown in FIG. 9. The network(s) 904 represent one or more communications networks that enable components to communicate and to transfer data therebetween, as well as to perform other functionalities described herein.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random-access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1 through 8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the networks 904 and other system components. Such circuitry may comprise conventional transceivers of a type well known in the art.

The other processing devices 902 (902-2, 902-3, . . . 902-K) of the processing platform 900 are assumed to be configured in a manner similar to that shown for processing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the system shown as 900 in FIG. 9 may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-9 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory;
the at least one processing device being configured to:
obtain, from a plurality of baseband units of a radio access network, a plurality of data sets, wherein respective ones of the plurality of data sets correspond to operational statistics of respective ones of the plurality of baseband units;
generate, for each of at least a subset of the plurality of baseband units, a forecasted data set corresponding to one or more predicted operational statistics of the baseband unit, wherein the forecasted data set is generated using a first machine learning model;
analyze, for each of the at least a subset of the plurality of baseband units, the forecasted data set to predict a future occurrence of a technical issue and to determine at least one corrective action for the predicted future occurrence of the technical issue, wherein the analysis is performed using a second machine learning model; and
cause initiation of the at least one corrective action.

2. The apparatus of claim 1, wherein causing initiation of the at least one corrective action further comprises causing initiation of an action to one of prevent the future occurrence of the technical issue and lessen an effect of the technical issue when the technical issue occurs.

3. The apparatus of claim 2, wherein the action further comprises spawning an additional baseband unit in the radio access network.

4. The apparatus of claim 2, wherein the action further comprises changing a configuration of at least one of the plurality of baseband units.

5. The apparatus of claim 1, wherein causing initiation of the at least one corrective action further comprises generating an alert to a network administrator.

6. The apparatus of claim 1, wherein the first machine learning model comprises an autoregressive integrated moving average model.

7. The apparatus of claim 1, wherein the second machine learning model comprises a random forest ensemble model.

8. The apparatus of claim 1, wherein the radio access network comprises a cloud radio access network wherein the plurality of baseband units are centrally located with respect to each other and operatively coupled via a fronthaul link to a plurality of remote radio head units.

9. The apparatus of claim 1, wherein the at least one processing device further comprises a baseboard management controller configured to perform the obtaining, generating, analyzing and causing operations.

10. The apparatus of claim 1, wherein obtaining the plurality of data sets further comprises respectively obtaining the plurality of data sets from the plurality of baseband units via a plurality of passthrough channels.

11. The apparatus of claim 1, wherein analyzing the forecasted data set to predict a future occurrence of a technical issue and to determine at least one corrective action for the predicted future occurrence of the technical issue further comprises correlating at least a portion of the operational statistics from at least one of the baseband units with at least a portion of the operational statistics from at least another one of the baseband units.

12. A method comprising:
obtaining, from a plurality of baseband units of a radio access network, a plurality of data sets, wherein respective ones of the plurality of data sets correspond to operational statistics of respective ones of the plurality of baseband units;
generating, for each of at least a subset of the plurality of baseband units, a forecasted data set corresponding to one or more predicted operational statistics of the baseband unit, wherein the forecasted data set is generated using a first machine learning model;
analyzing, for each of the at least a subset of the plurality of baseband units, the forecasted data set to predict a future occurrence of a technical issue and to determine at least one corrective action for the predicted future occurrence of the technical issue, wherein the analysis is performed using a second machine learning model; and
causing initiation of the at least one corrective action;
wherein the obtaining, generating, analyzing, and causing steps are performed by a processing device comprising at least one processor coupled to at least one memory executing program code.

13. The method of claim 12, wherein causing initiation of the at least one corrective action further comprises causing initiation of an action to one of prevent the future occurrence of the technical issue and lessen an effect of the technical issue when the technical issue occurs.

14. The method of claim 13, wherein the action further comprises spawning an additional baseband unit in the radio access network.

15. The method of claim 13, wherein the action further comprises changing a configuration of at least one of the plurality of baseband units.

16. The method of claim 12, wherein the processing device further comprises a baseboard management controller configured to perform the obtaining, generating, analyzing and causing operations.

17. The method of claim 12, wherein obtaining the plurality of data sets further comprises respectively obtaining the plurality of data sets from the plurality of baseband units via a plurality of passthrough channels.

18. The method of claim 12, wherein analyzing the forecasted data set to predict a future occurrence of a technical issue and to determine at least one corrective action for the predicted future occurrence of the technical issue further comprises correlating at least a portion of the operational statistics from at least one of the baseband units with at least a portion of the operational statistics from at least another one of the baseband units.

19. A computer program product comprising a non-transitory processor-readable storage medium having stored therein program code of one or more software programs, wherein the program code when executed by at least one processing device cause the at least one processing device to:
obtain, from a plurality of baseband units of a radio access network, a plurality of data sets, wherein respective ones of the plurality of data sets correspond to operational statistics of respective ones of the plurality of baseband units;
generate, for each of at least a subset of the plurality of baseband units, a forecasted data set corresponding to one or more predicted operational statistics of the baseband unit, wherein the forecasted data set is generated using a first machine learning model;
analyze, for each of the at least a subset of the plurality of baseband units, the forecasted data set to predict a future occurrence of a technical issue and to determine at least one corrective action for the predicted future occurrence of the technical issue, wherein the analysis is performed using a second machine learning model; and
cause initiation of the at least one corrective action.

20. The computer program product of claim 19, wherein the radio access network comprises a cloud radio access network wherein the plurality of baseband units are centrally located with respect to each other and operatively coupled via a fronthaul link to a plurality of remote radio head units.

\* \* \* \* \*